US006935868B1

(12) United States Patent
Campini et al.

(10) Patent No.: US 6,935,868 B1
(45) Date of Patent: Aug. 30, 2005

(54) ADJUSTABLE-WIDTH, DUAL-CONNECTOR CARD MODULE

(75) Inventors: Edoardo Campini, Mesa, AZ (US); Mark D. Summers, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/879,464

(22) Filed: Jun. 29, 2004

(51) Int. Cl.[7] .............................................. H01R 12/00
(52) U.S. Cl. ......................................... 439/67; 361/748
(58) Field of Search .......................... 439/67, 292, 293; 361/748, 758, 749, 804, 760, 742, 770

(56) References Cited

U.S. PATENT DOCUMENTS

| | | | | |
|---|---|---|---|---|
| 4,203,642 | A * | 5/1980 | Minard et al. | 439/359 |
| 5,909,359 | A * | 6/1999 | Summers et al. | 361/748 |
| 6,109,930 | A * | 8/2000 | Koschmeder et al. | 439/74 |
| 6,302,705 | B1 * | 10/2001 | Yatskov et al. | 439/67 |

FOREIGN PATENT DOCUMENTS

| | | | | |
|---|---|---|---|---|
| DE | 019919188 | A1 * | 11/2000 | H05K 7/18 |

* cited by examiner

*Primary Examiner*—Briggitte Hammond
(74) *Attorney, Agent, or Firm*—Blakely, Sokoloff, Taylor & Zafman LLP

(57) ABSTRACT

An adjustable-width, dual-connector card module. The module includes an adjustable-width printed circuit board (PCB) assembly including first and second PCBs, each having a respective end connector. A flexible connector is coupled to each of the PCBs to enable electrical signals to pass therebetween. An adjustable width stiffening mechanisms is employed to maintain the end connectors in a common plane, while enabling the distance between the PCBs to be adjusted. In one embodiment, the end connectors are edge connectors that are designed to mate with corresponding Advance Mezzanine Card (AMC) connectors, and the module is configured to have a form factor corresponding to either a full-height or half-height double-width AMC module. In one embodiment, one or more AMC modules of these configurations are installed in an Advanced Telecom Computing Architecture (ATCA) carrier board, which in turn is installed in an ATCA chassis.

28 Claims, 15 Drawing Sheets

*Fig. 5a*
*(Prior Art)*
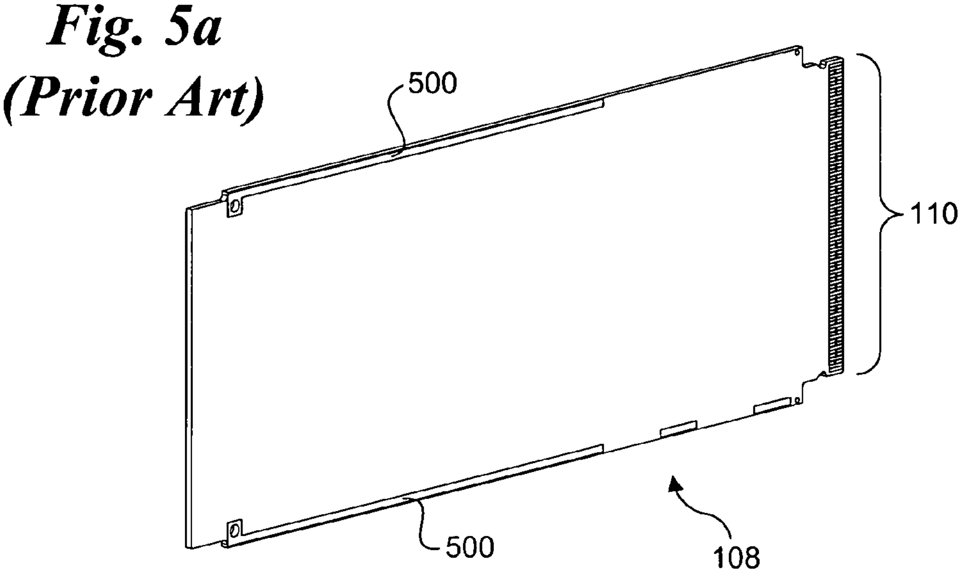
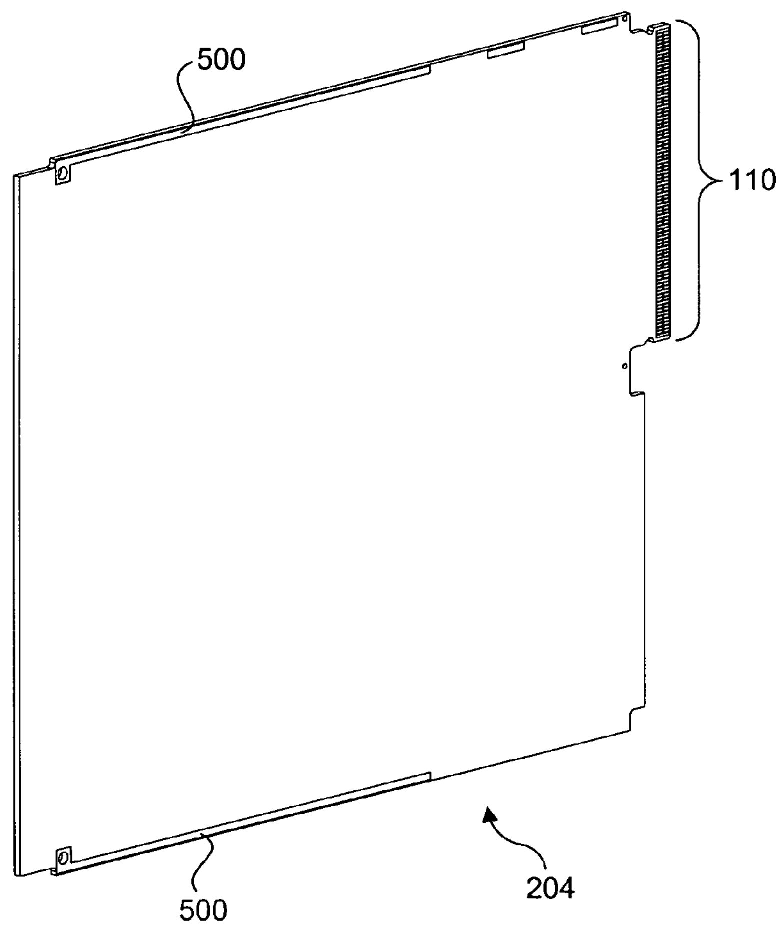
*Fig. 5b*
*(Prior Art)*

ADJUSTABLE-WIDTH, DUAL-CONNECTOR CARD MODULE

FIELD OF THE INVENTION

The field of invention relates generally to computer and telecommunications equipment, and, more specifically but not exclusively relates to an adjustable-width dual connector card module for use in computer and telecommunication equipment.

BACKGROUND INFORMATION

The Advanced Telecom Computing Architecture (ATCA) (also referred to as AdvancedTCA) standard defines an open switch fabric based platform delivering an industry standard high performance, fault tolerant, and scalable solution for next generation telecommunications and data center equipment. The development of the ATCA standard is being carried out within the PCI Industrial Computer Manufacturers Group (PICMG). The ATCA 3.0 base specification (January, 2003) defines the physical and electrical characteristics of an off-the-shelf, modular chassis based on switch fabric connections between hot-swappable blades. The Advanced TCA base specification supports multiple fabric connections, and multi-protocol support (i.e., Ethernet, Fibre Channel, InfiniBand, StarFabic, PCI Express, and RapidIO) including the Advanced Switching (AS) technology.

The ATCA 3.0 base specification defines the frame (rack) and shelf (chassis) form factors, core backplane fabric connectivity, power, cooling, management interfaces, and the electromechanical specification of the ATCA-compliant boards. The electromechanical specification is based on the existing IEC60297 EuroCard form factor, and enables equipment from different vendors to be incorporated in a modular fashion and be guaranteed to operate. The ATCA 3.0 base specification also defines a power budget of 200 Watts (W) per board, enabling high performance servers with multi-processor architectures and multi gigabytes of on-board memory.

Recently, the modularity of the ATCA architecture has been extended to another level, wherein multiple mezzanine cards (or modules) may be hosted by an ATCA carrier board. Proposed standards for the mezzanine cards/modules and related interfaces are defined by the Advanced Mezzanine Card (AMC or AdvancedMC) specification, which is currently a proposed PCI Industrial Computer Manufacturers Group specification (PICMG AMC.0) for hot-swappable, field-replaceable mezzanine cards. Optimized for packet-based, high-availability telecom systems, AMC cards can be attached to a variety of ATCA and proprietary carrier blades. AMCs communicate with the carrier card via a packet-based serial interface, which features up to 21 lanes of high-speed input/output (I/O) at 12.5 Gbit/sec each. The specification defines standard mezzanine module configuration for both full-height and half-height AMC cards, as well as single-width and double-width cards. AMC is slated to support a variety of protocols, including Ethernet, PCI Express, and Serial Rapid I/O. AMC also features integrated $I^2C$- and Ethernet-based system management. AMC modules may also be employed for non-ATCA systems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5*a* is an isometric view of a single-width printed circuit board (PCB) card used in a half-height or full-height single-width AMC module;

FIG. 5*b* is an isometric view of a double-width PCB card having a single edge connector used in a conventional half-height or full-height double-width AMC module;

DETAILED DESCRIPTION

Embodiments of an adjustable-width dual connector card assembly and modules employing the assembly are described herein. In the following description, numerous specific details are set forth, such as implementations for Advanced Mezzanine Card (AMC) cards and Advanced Telecommunication Architecture (ATCA) carrier boards and chassis, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
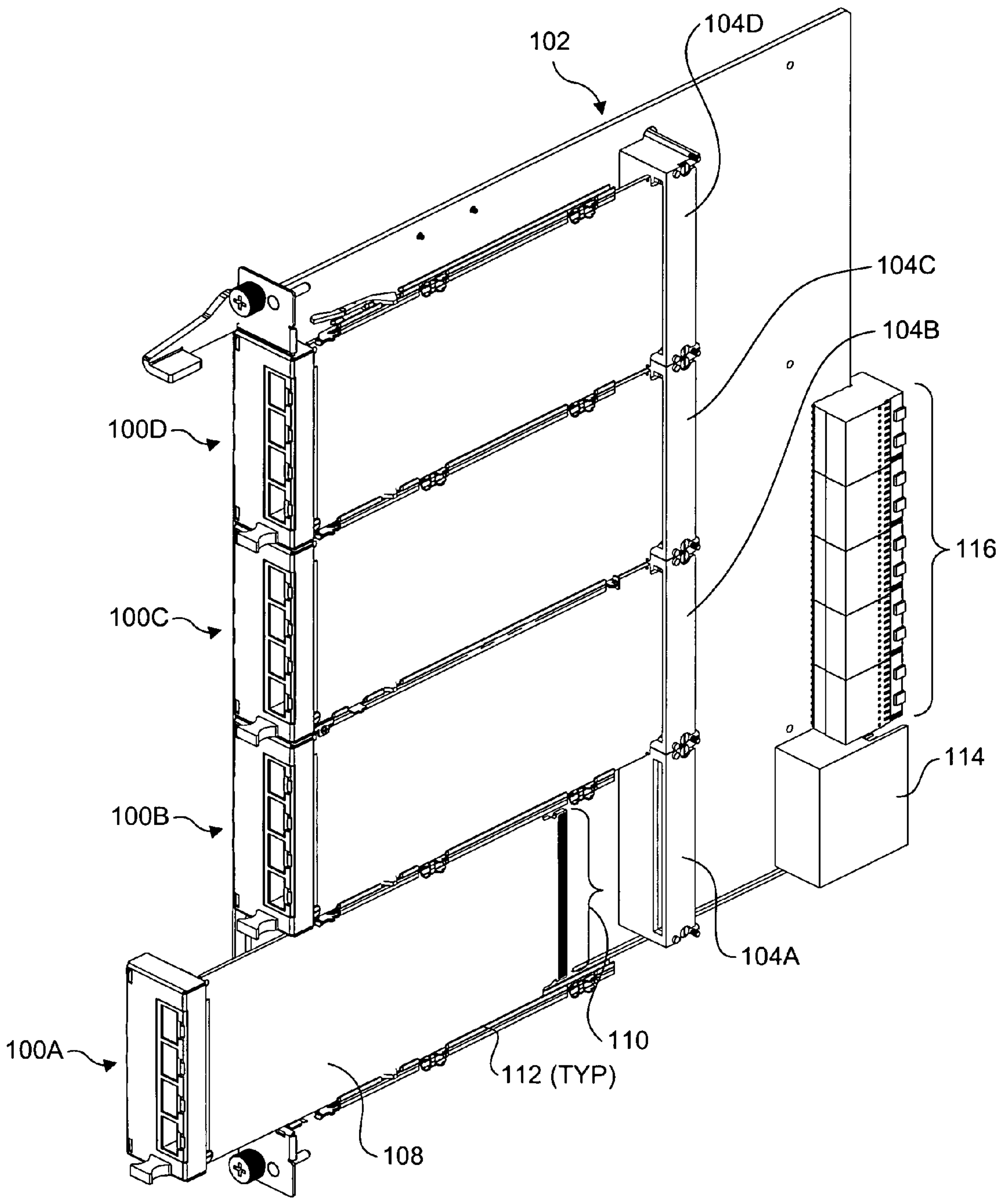
FIG. 1 is an isometric view of an Advanced Telecommunication Architecture (ATCA) carrier board to which four full-height single-width Advance Mezzanine Card (AMC) modules are coupled.

FIG. 1 shows an exemplary AMC module implementation wherein four single-width full-height AMC modules 100A, 100B, 100C, and 100D are installed on an ATCA carrier board 102. In general, ATCA carrier boards may have various configurations, depending on the number and type of AMC modules the carrier board is designed to host. For example, ATCA carrier board 102 includes four single-width full-height AMC connectors 104A, 104B, 104C, and 104D.

Under the proposed standard, full-height AMC connectors are referred to as Style "B" (basic) or "B+" (extended) connectors. The term "basic" is associated with AMC connectors that are equipped with conductive traces on only one side of the connector slot. The term "+" identifies the connector as an extended connector having conductive traces on both sides of the connector slot. A single-width AMC module includes a single-width AMC card 108 having a single-width edge connector 110, further details of which are shown in FIG. 5*a*. As with its mating connector, a single-width edge connector may include pins on a single side (basic) or both sides (extended).

The horizontal (or longitudinal) card edges of an AMC card are guided via a set of guide rails 112 disposed on opposing sides of the card. An ATCA carrier board also includes a power connector 114 via which power is provided to the carrier board from an ATCA chassis backplane, and various input/output (I/O) connectors 116 via which signals are routed to the backplane, and hence to other ATCA boards and/or AMC modules (mounted to other ATCA carrier boards) that are similarly coupled to the ATCA backplane.

Generally, the circuit components on an AMC module PCB card will be disposed on the side of the card facing the top or front side of the corresponding carrier board. This protects the circuitry, among other reasons for the configuration. To add further protection, an ATCA carrier board assembly will typically include a cover plate that is disposed over the backside of the AMC module PCB cards, such as shown in FIG. 10*b*; the ATCA carrier board assemblies of FIGS. 1, 2, 3, and 10*a* do not show the cover plate for clarity in illustrating how the PCB card edge connectors are mated to corresponding AMC connectors.

Figure 2:
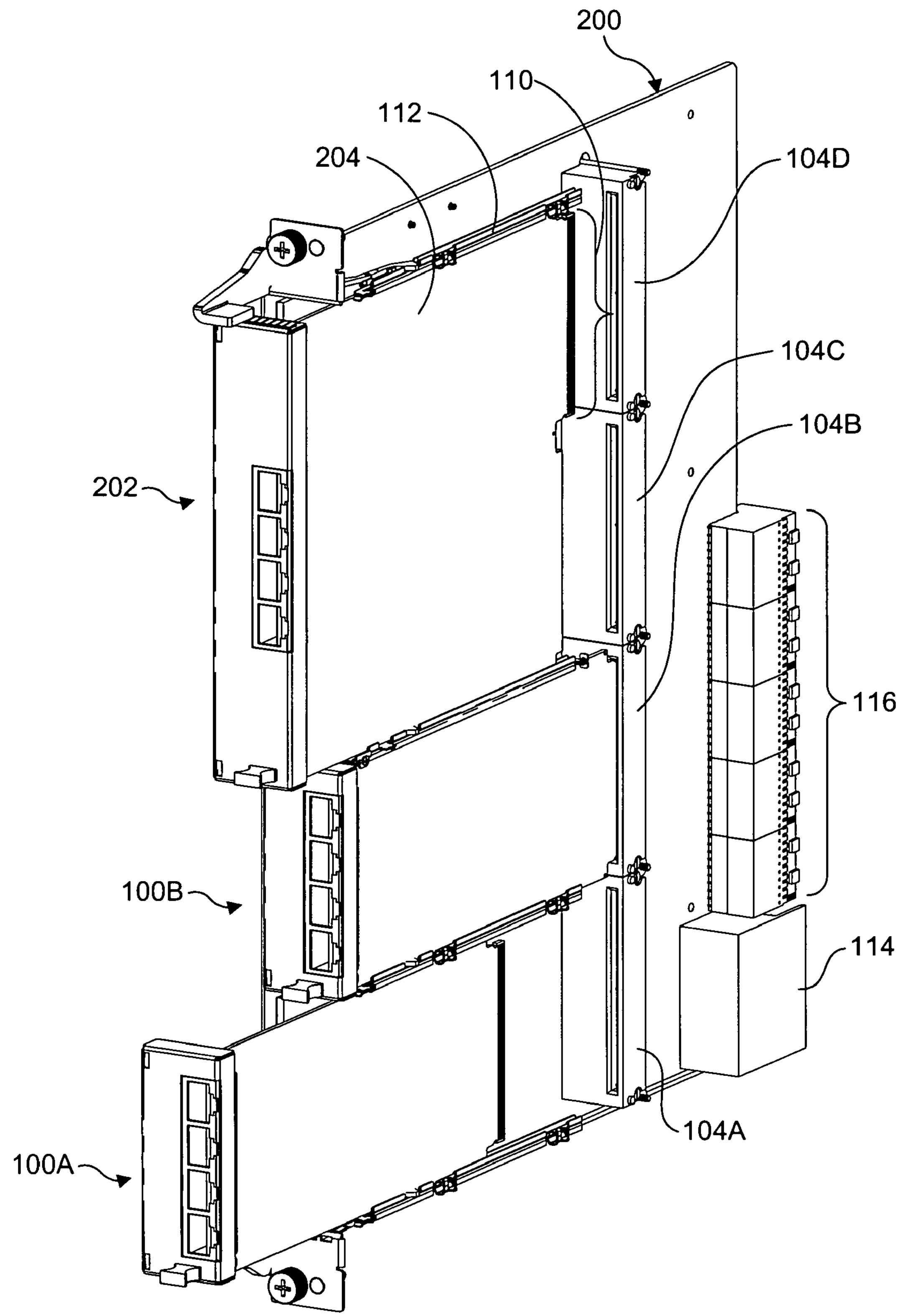
FIG. 2 is an isometric view of an ATCA carrier board to which to full-height single-width AMC modules and one conventional full-height double-width AMC module are coupled.

An ATCA carrier board 200 that supports a combination of single-width and double-width full-height AMC modules is shown in FIG. 2. As with the configuration of FIG. 1, ATCA carrier board 200 includes four full-height AMC connectors 104A, 104B, 104C, and 104D. Guide rails 112 are configured for receiving a pair of single-width full-height AMC modules 100A and 100B, as well as a double-width full-height AMC module 202. A double-width full-height module includes a double-width PCB card 204 including a single edge connector 110, as shown in FIG. 5*b*. Thus, when a conventional double-width full-height AMC module is installed, it is coupled to a single single-width full-height AMC connector 104.

Figure 3:
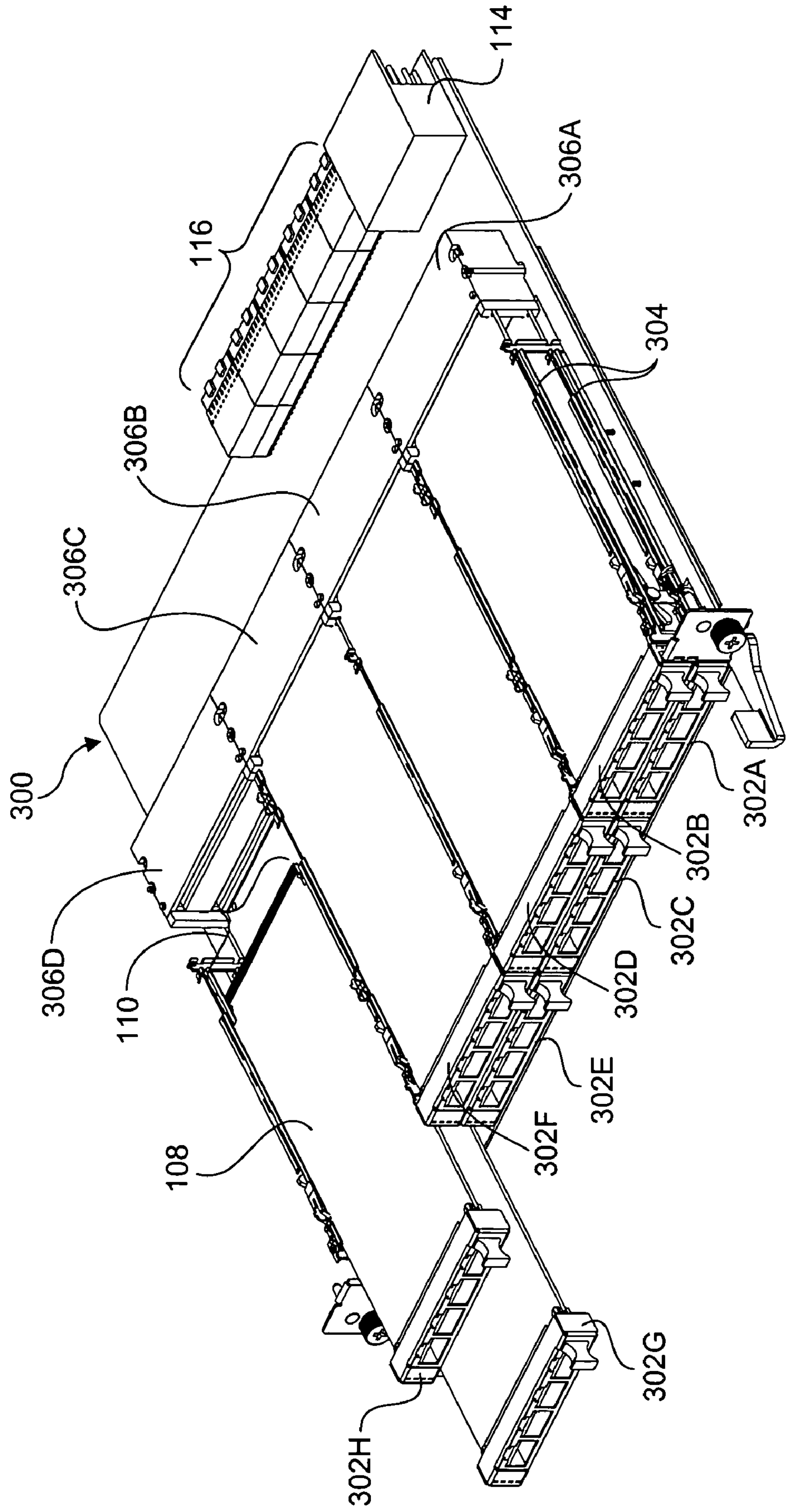
FIG. 3 is an isometric view of an ATCA carrier board to which to eight half-height single-width AMC modules are coupled.

In addition to full-height AMC modules, the proposed specification defines use of single- and double-width half-height modules that may be stacked in a pair-wise manner that supports up to eight single-width, half-height modules. For example, such a configuration is shown in FIG. 3, which includes an ATCA carrier board 300 configured to support eight single-width single height AMC modules 302A, 302B, 302C, 302D, 302E, 302F, 302G, 302H. The configuration of a single-width board is the same whether it is used in a half-height or full-height AMC module. In the case of half-height modules, sets of dual-height rails 304 are employed to guide the card edges of each module.

ATCA carrier board 300 includes four half-height AMC connectors 306A, 306B, 306C, and 306D. Each half-height AMC connector has one of two possible configurations, referred to as style "AB" (for single-sided connections), and style A+B+ (for double sided connections). The lower connector slot on a half-height AMC connector is referred to as slot "A", while the upper connector slot is referred to as slot "B," hence the names "AB" and "A+B+."

Figure 4:
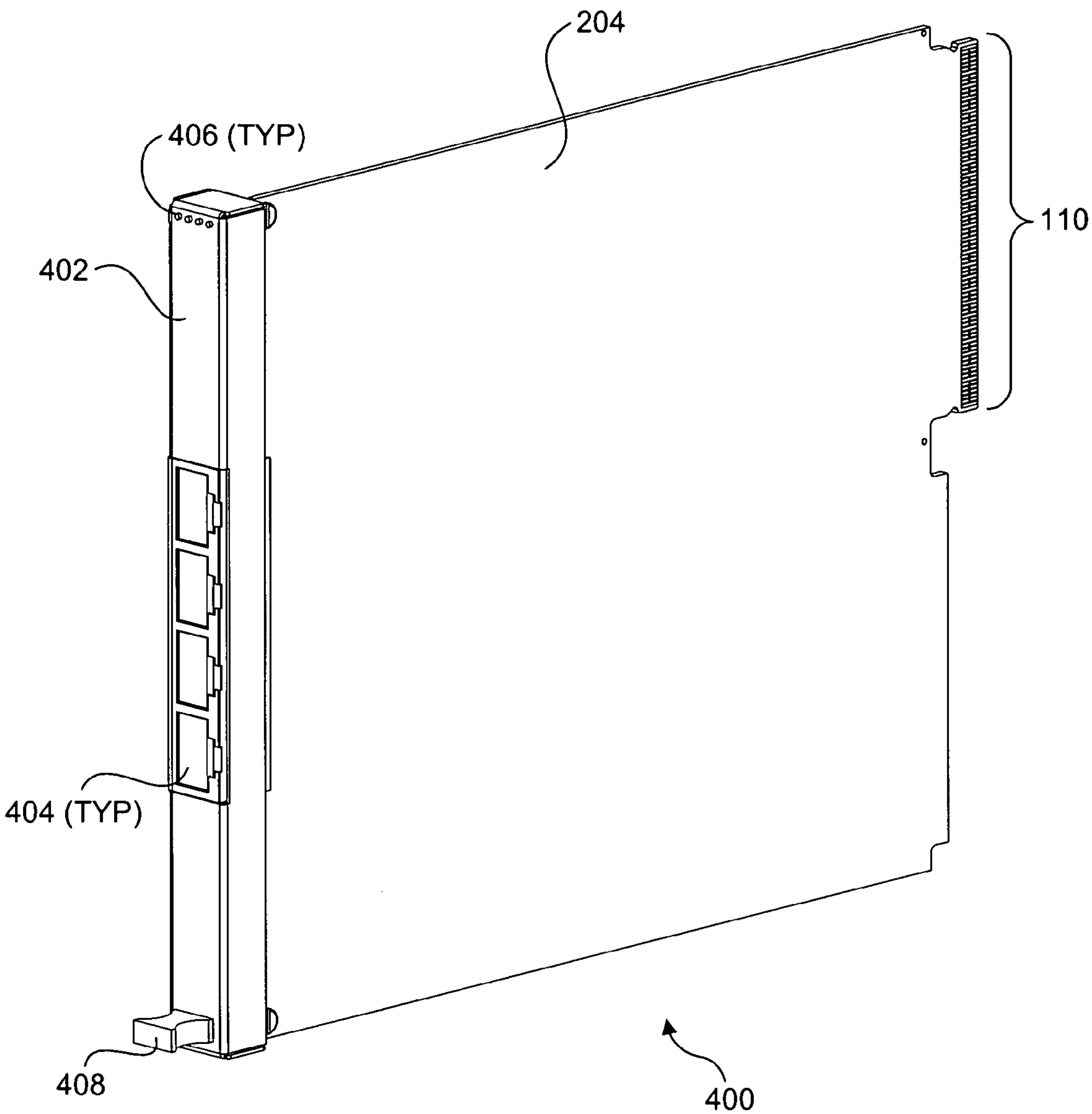
FIG. 4 is an isometric view of a conventional half-height double-width AMC module.

An example of a conventional half-height double-width AMC module 400 is shown in FIG. 4. The module includes a double-width PCB board 204 with a single edge connector 110; as with single-width modules, the configuration of a double-width PCB card is the same whether it is used in a half-height or full-height AMC module. The module 400 further includes a half-height front panel 402 (also referred to as a "face plate") coupled to PCB card 204. The front panel may generally include provisions for various input/output (I/O) ports via which external devices may communicate with a module. For illustrative purposes, FIG. 4 shows four RJ-45 Ethernet jacks 404. Various other types of I/O ports may also be employed, including, but not limited to universal serial bus (USB) ports, serial ports, infared ports, and IEEE 1394 ports. (It is noted that the port is typically coupled to the PCB card, with an appropriately-sized aperture defined in the front panel). A front panel may also include various indicators, such as light-emitting diodes (LEDs) 406, for example, as well as input switches (not shown). In addition, a front panel will typically include a handle or similar means for grasping a module when it is being installed or removed from a carrier board, such as depicted by a handle 408.

Further details of an AMC module single-width PCB card 108 are shown in FIG. 5*a*, while further details of an AMC module double-width PCB card 204 are shown in FIG. 5*b*. Each of PCB cards 108 and 204 include a pair of PCB rails 500 that are used to slidingly engage AMC guide rails 112 during insertion of the associated AMC module. In addition, each of single-width PCB card 108 and conventional double-width PCB card 204 include a respective edge connector 110 of identical configuration. The single-edge connector is configured to mate with a connector slot in an appropriately configured AMC connector, wherein the conductive traces at the edge of the PCB edge-connector (also referred to as contacts) act as male pins, which mate to a corresponding contacts (in the form of tiny balls that make contact to the traces on the AMC module edge connector) in the AMC connector slot. For example, a single-sided edge connector would have require an B or AB style AMC connector. Similarly, a double-sided edge connector requires a B+ or A+B+ style AMC connector.

Figure 6:
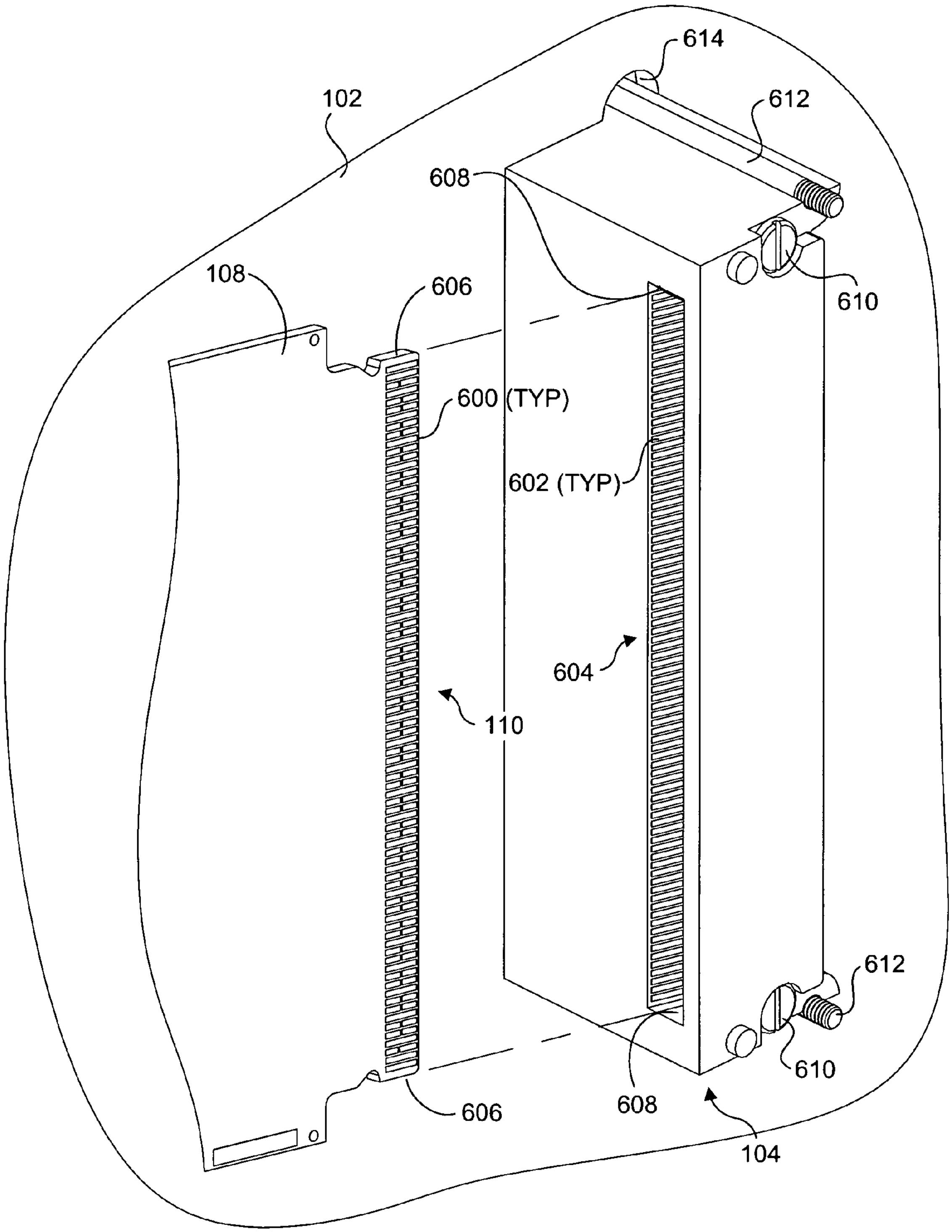
FIG. 6 is a detailed isometric view of the coupling and self-centering action between an edge connector and an AMC connector.

Details of an AMC module PCB board edge connector 110 and full-height AMC connector 104 are shown in FIG. 6. A single-sided edge connector includes 85 contacts 600, while a double-side edge connector includes 170 contacts 600 (85 on both sides). The pitch of the contacts is 0.75 millimeters mm. In order to accurately align the male edge-connector contacts 600 with the corresponding female AMC connector traces 602, a self-centering scheme is employed, such that the edge connector becomes centered within the AMC connector slot 604 upon insertion of an AMC module. This is accomplished via a sliding engagement between edges 606 of edge connector 110 with mating edges 608 formed on the inside of the connector slot 606 of full-height AMC connector 104. The tolerance between the mating parts is very tight to ensure high accuracy in the alignment of the mating electric traces. Such high accuracy is required, in part, due to the high-frequency of the numerous I/O signals coupled via an AMC connector in view of the very small contact size and contact pitch.

Generally, double-width AMC modules are employed to provide functionality that either is not possible to implement on a single-width PCB card, or would otherwise be unfeasible or undesirable. For example, the board area of a single-width PCB card may be insufficient to support a layout area required for a particular set of components. While this is advantageous in some respects, it is a less then optimal solution, since only a single edge connection is available under the conventional approach. This limits both the number of I/O connections, as well as the aggregated power consumption of the module's circuitry.

More particularly, the maximum number of connections for a single-edge connector is 170 pins, while the maximum power consumption for a given module is 35 watts. It is noted that both of these values is limited by the single-width AMC connector used to couple a single-width or double-width AMC module to the ATCA carrier board.

Figure 7:
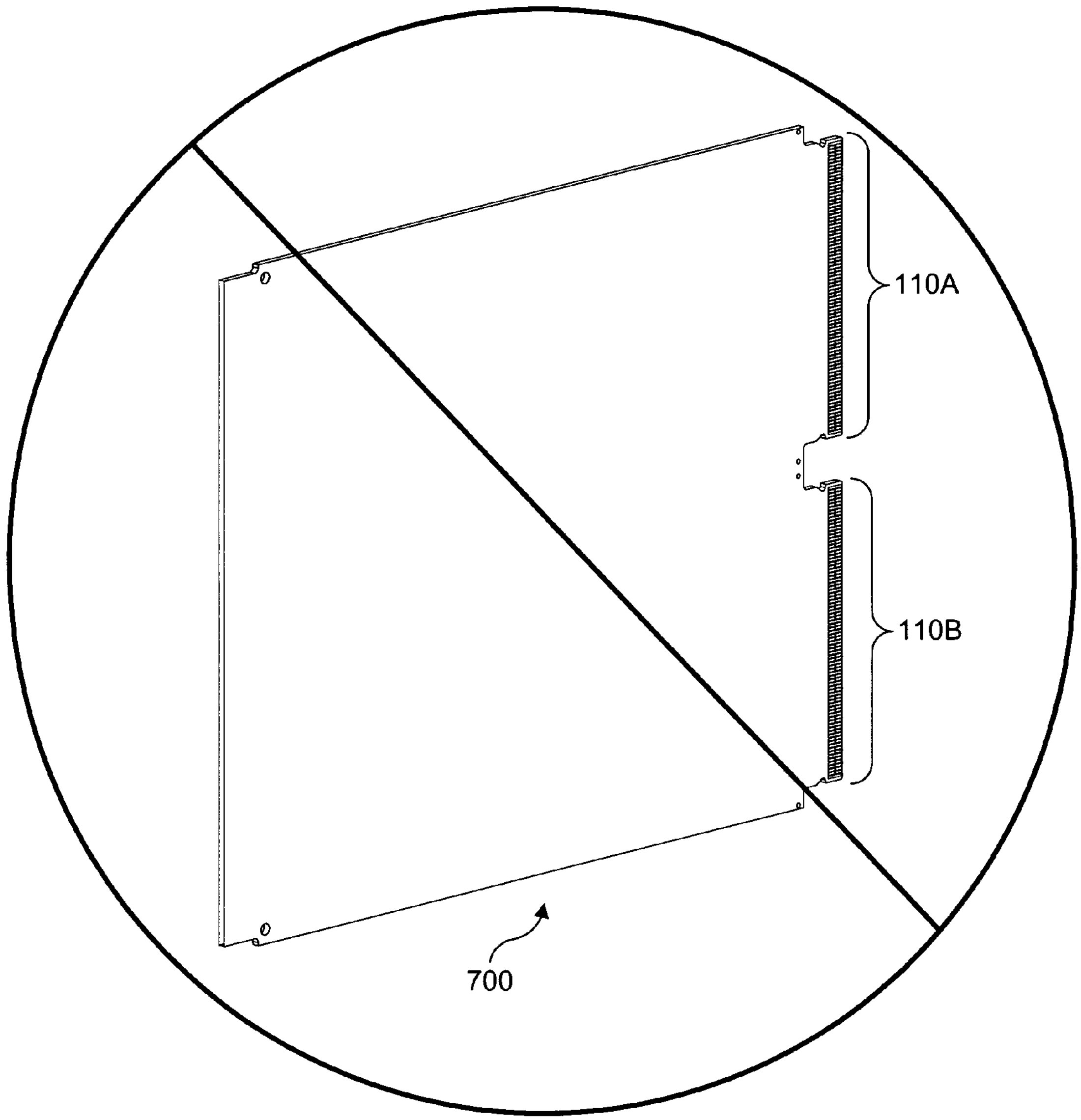
FIG. 7 is a schematic diagram of a double-width PCB card that is not allowed for use by a proposed AMC standard.

One technique for increasing available power and/or I/O connections would be to add a second edge connector to a double-width PCB card, such as depicted by a dual connector double-width PCB card 700 in FIG. 7, which includes two edge connectors 110A and 110B having the same configuration as edge connector 110. However, this technique, by itself, is not recommended by the standard for significant reasons. Notably, the mechanical tolerance stack-up between the various parts that are to be coupled together (e.g., the mechanical tolerance of the dimensions for the carrier board, the first and second single connectors, and the first and second edge connectors, as well as the alignment tolerance between the coupled components) does not guarantee that both edge connectors would be properly installed. For example, a given AMC connector (either full-height or half-height) is typically coupled to a carrier board 102 via multiple fasteners 610 and 612, as shown in FIG. 6. The mechanical tolerances between the fastener diameters and the corresponding holes via which the fastener shanks pass through the carrier board PCB (such as depicted by a hole 614) are relatively large, especially when compared with the connector tolerances. As a result, the distance between adjacent connectors could vary quite a bit.

This conflicts with the self-centering aspect of the connector design. Notably, the distance between the edge connectors 110A and 110B or dual connector double-width PCB card 700 is substantially fixed, while the distance between the slots in a pair of adjacent AMC connectors coupled to a carrier board is not. As the edge connectors engage the corresponding slots in the AMC connectors during card insertion, forces will be applied to each edge connector in an attempt to center that edge connector within its respective AMC connector slot. If the distances do not match, an excessive level of mechanical stress in the double-width PCB card and/or the carrier board and AMC connectors could be induced. Such mechanical stresses also could eventually damage one or more of the connectors, PCB card, and/or carrier board.

One technique for avoiding the mechanical stress would be to remove the self-centering feature of one of the two AMC single-width connectors. However, this would defeat the self-centering feature (which is used to ensure adequate alignment between PCB edge contacts and mating connector traces), possibly producing a situation under which inadequate signal-coupling exists. This is especially problematic when considering the multi-gigabit transfer rates of the serial I/O channels provided by ATCA-compliant interfaces, such as PCI Express. Another important factor is modifying an AMC connector in this manner would violate the AMC proposed standard.

Embodiments of the present invention provide the benefits of a dual connector while address the foregoing limitations associated with employing two connectors on a double-width PCB card by enabling the distance between the edge connectors to be varied. At the same time, an adjustable stiffening mechanism is provided to enhance the mechanical integrity of the assembly while maintaining the edge connectors in appropriate alignment for insertion into a pair of adjacent AMC connectors.

Figure 8A:
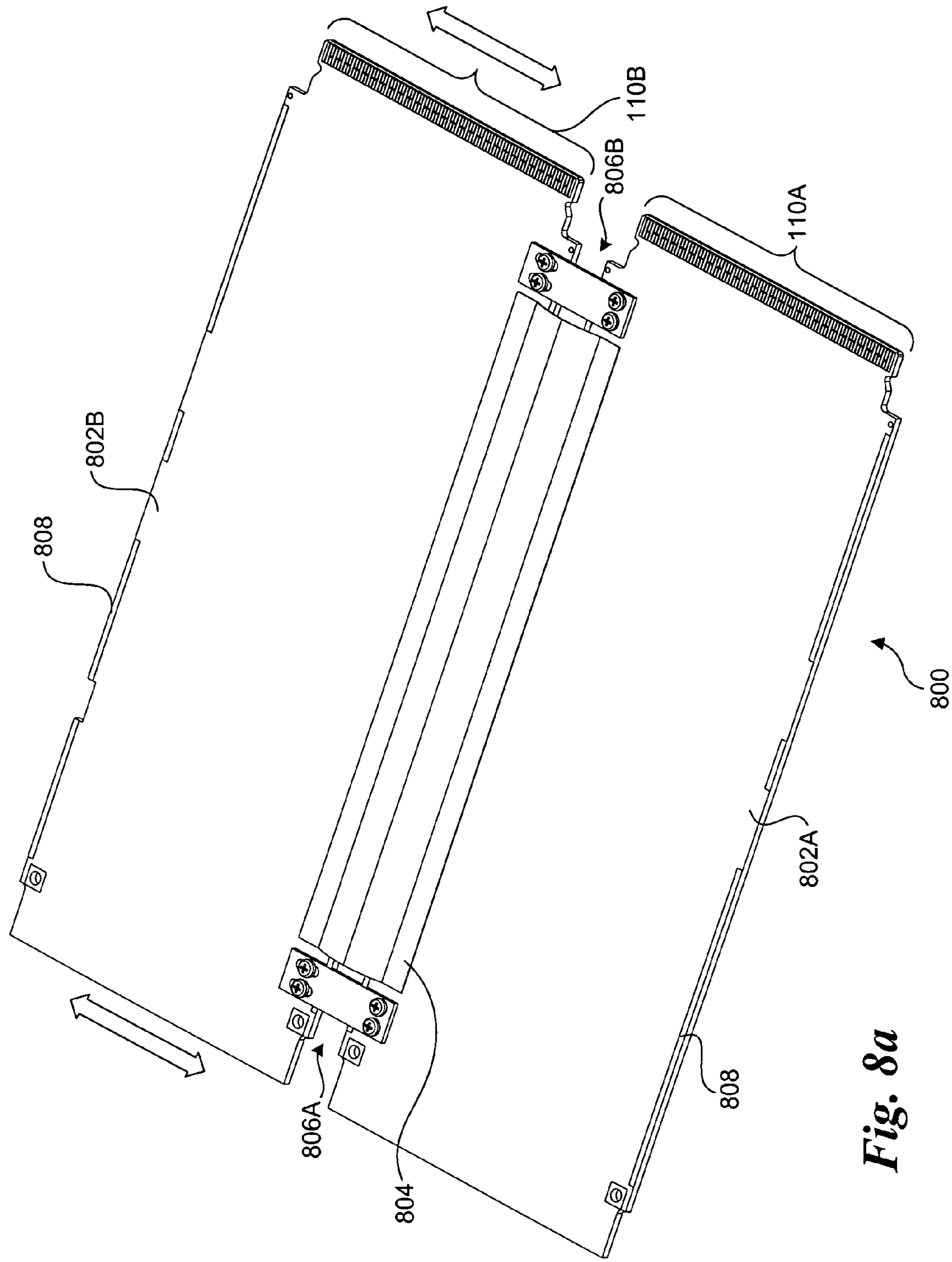
FIG. 8*a* is an isometric view of an adjustable double-width PCB card assembly including a pair of adjustable-width stiffening mechanisms, according to one embodiment of the invention.

An exemplary adjustable double-width dual connector PCB card assembly 800 suitable for use in an adjustable double-width AMC module, according to one embodiment, is shown in FIG. 8*a*. The assembly includes two single-width PCB cards 802A and 804B, which are coupled via a flexible connector 804. In one embodiment, flexible connector 804 comprises a flex circuit. In one embodiment, single-width PCB cards are substantially identical to single-width PCB cards used in conventional single-width AMC modules. The assembly further includes a pair of width-adjustable stiffening mechanisms 806A and 806B, which enable the separation distance between single-width PCB cards 802A and 802B to be adjusted while stiffening the assembly and maintaining the PCB card edge connectors 110A and 110B in a common plane an in parallel alignment.

Figure 8B:
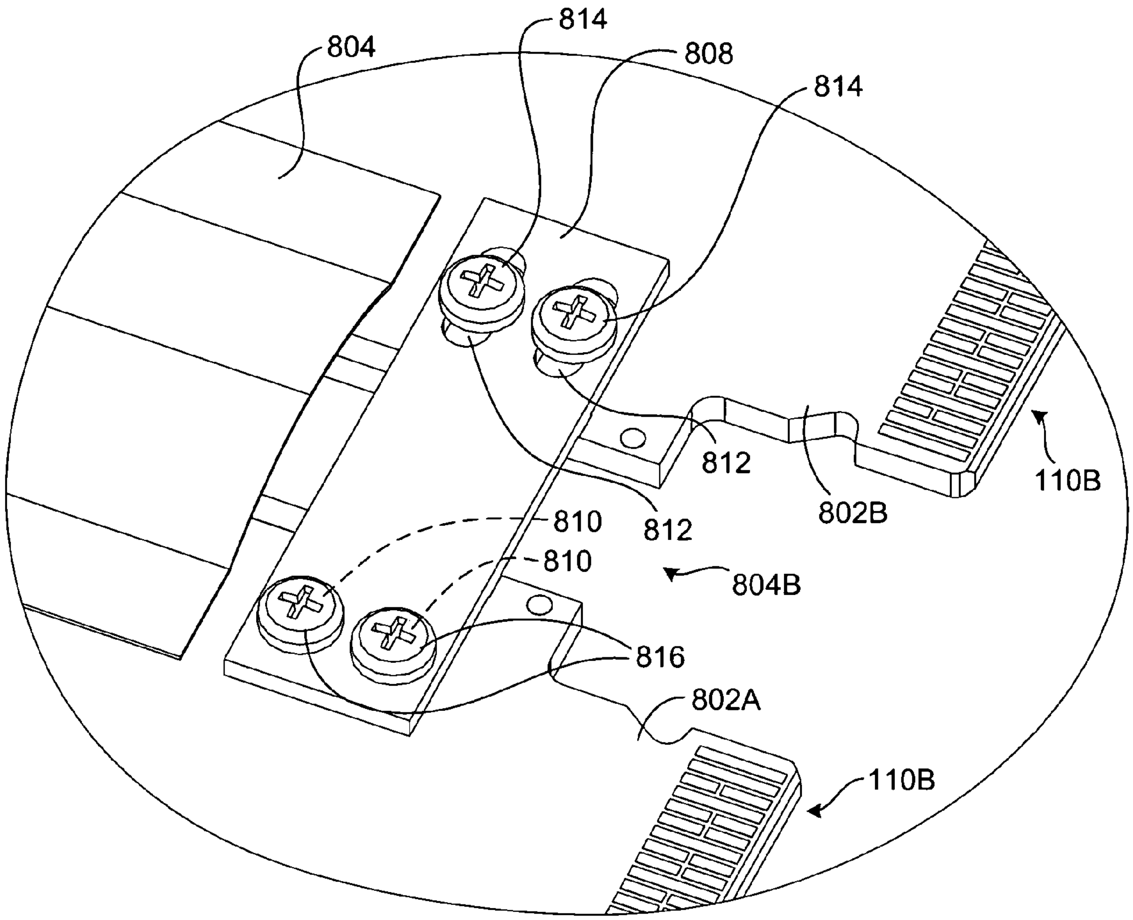
FIG. 8*b* is an isometric view illustrating details of the adjustable-width stiffening mechanism of FIG. 8*a;*

As shown in FIG. 8*b*, width-adjustable stiffening mechanism 804 includes a bracket 808 having a pair of holes 810 defined in one end and a pair of slots 812 defined in the opposing end. The slotted end of bracket 808 is slidingly coupled to single-width PCB card 802B via a pair of fasteners 814, while the opposing end of the bracket is fixedly coupled to single-width PCB card 802A via a pair of fasteners 816 passing through holes 810. Various types of fasteners may be used for fasteners 814 and 816, such as but not limited to screws, and rivets. In one embodiment, fasteners 814 comprise shoulder screws, wherein the shoulder/slot size is selected such that the shoulder screw shoulder slidingly engages the slot (with a small amount of tolerance).

Figure 9A:
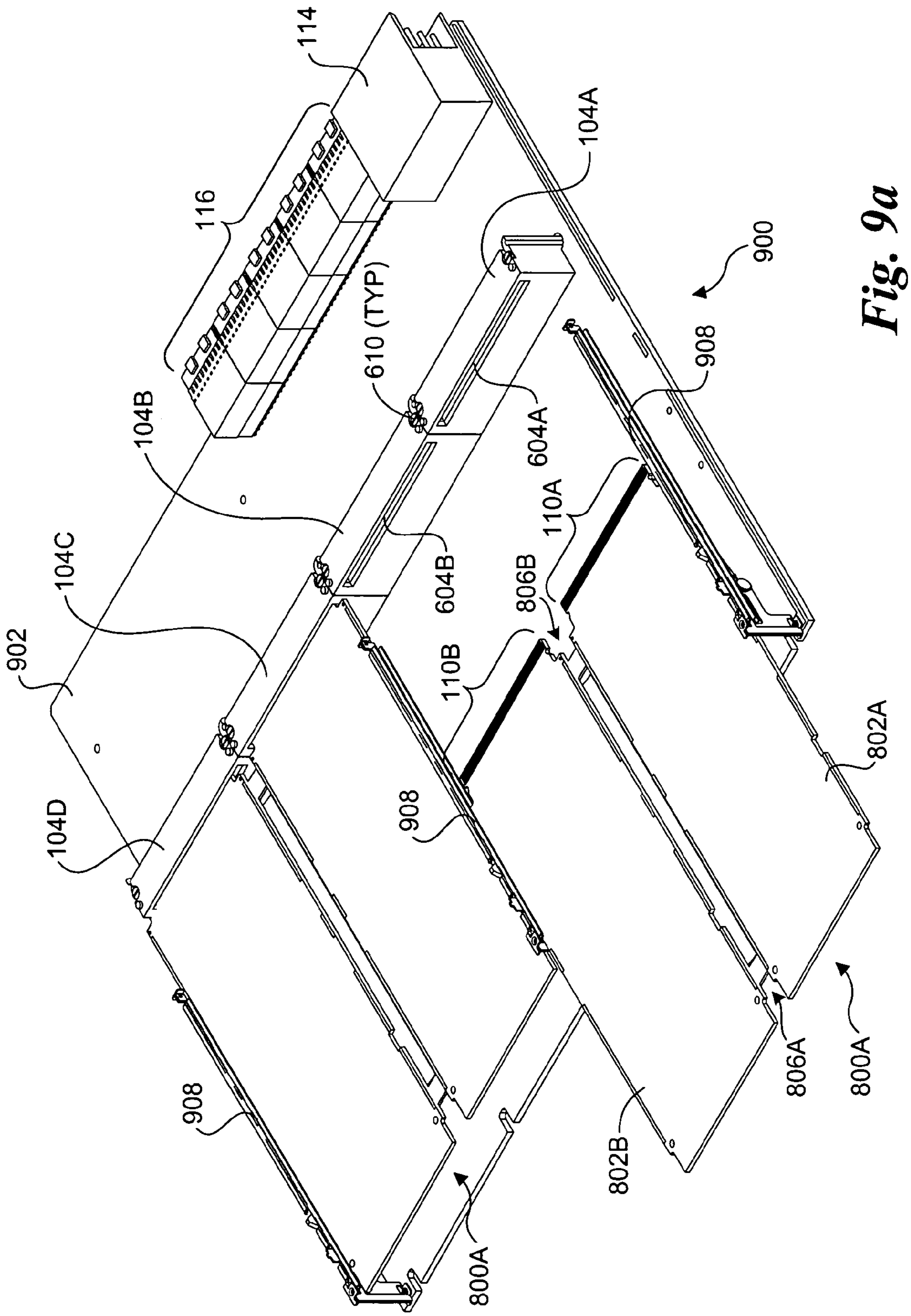
FIGS. 9*a* and 9*b* respectively show topside and underside isometric views of an ATCA carrier board assembly including a pair of adjustable double-width PCB card assemblies.
Figure 9B:
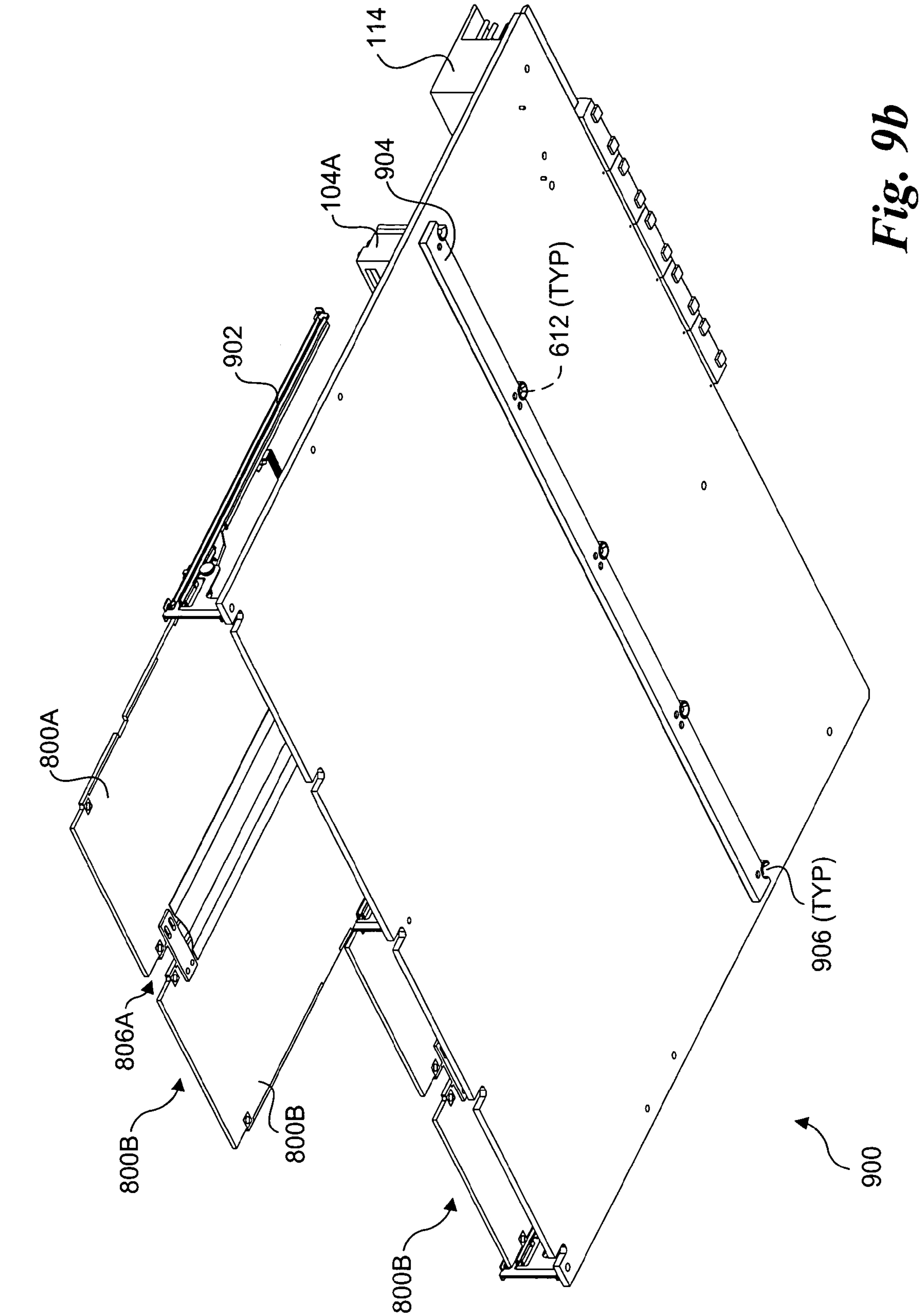

FIGS. 9*a* and 9*b* shows details of a pair of adjustable double-width dual connector PCB card assemblies 800A and 800B being installed on an ATCA carrier board 900. (For clarity, only the PCB card assemblies are shown in FIGS. 9*a* and 9*b*; details of AMC modules that include adjustable double-width dual connector PCB card assemblies are shown in FIGS. 10*a*, 10*b*, 11, and 12.) The carrier board includes four full-height AMC connectors 104A, 104B, 104C, and 104D, which are mounted to PCB 902 of the carrier board using multiple fasteners 610 and 612. As shown in FIG. 9*b*, the fasteners 610 are threaded into a stiffener bar 904 that spans the underside of PCB 902. The stiffening bar serves the dual purposes of providing an anchor via which the AMC connectors may be securely coupled to PCB 902, and to provide a stiffening function for the carrier board assembly. In addition, clearances 906 are formed in stiffener bar 904 to enable the heads of fasteners 612 to mate with the underside of PCB 902.

As shown by the partial insertion of adjustable double-width dual connector PCB card assembly 800A in FIGS. 9*a* and 9*b*, a pair of rails 908 are used to guide the outside edges of PCB cards 802A and 802B. However, there is some clearance between the rail slots and the PCB card edges to allow the assembly to float laterally. The adjustable-width stiffening assemblies 806*a* and 806B enable the distance between PCB cards 802A and 802B be slightly adjusted, while keeping edge connectors 100B and 100A in the same plane and in parallel alignment.

As each of edge connectors 100B and 100A is inserted into a respective connector slot 604A and 600B in AMC connectors 104A and 104B, the self-centering function of the connector interface is applied such that each edge connector is centered within its respective connector slot. This may change the distance between PCB cards 802A and 802B, which is facilitated by adjustable-width stiffening assemblies 806A and 806A. A fully-inserted adjustable double-width dual connector PCB card assembly 800B is shown toward the top of the carrier board assembly.

Figure 10A:
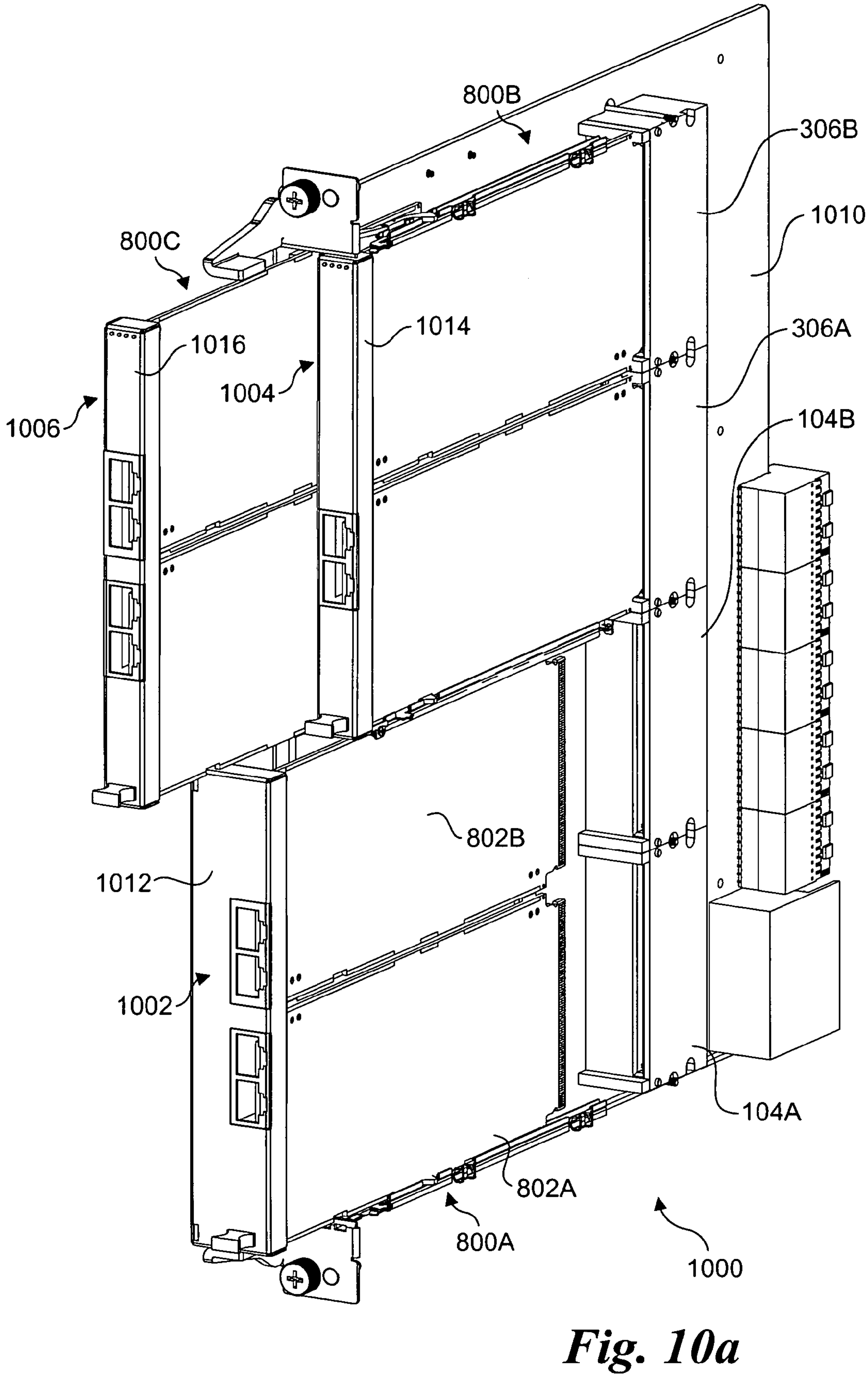
FIG. 10*a* shows an isometric view of exemplary adjustable double-width full height and half-height AMC modules that employ the adjustable double-width PCB card assemblies of FIG. 8*a* being installed on an ATCA carrier board.
Figure 10B:
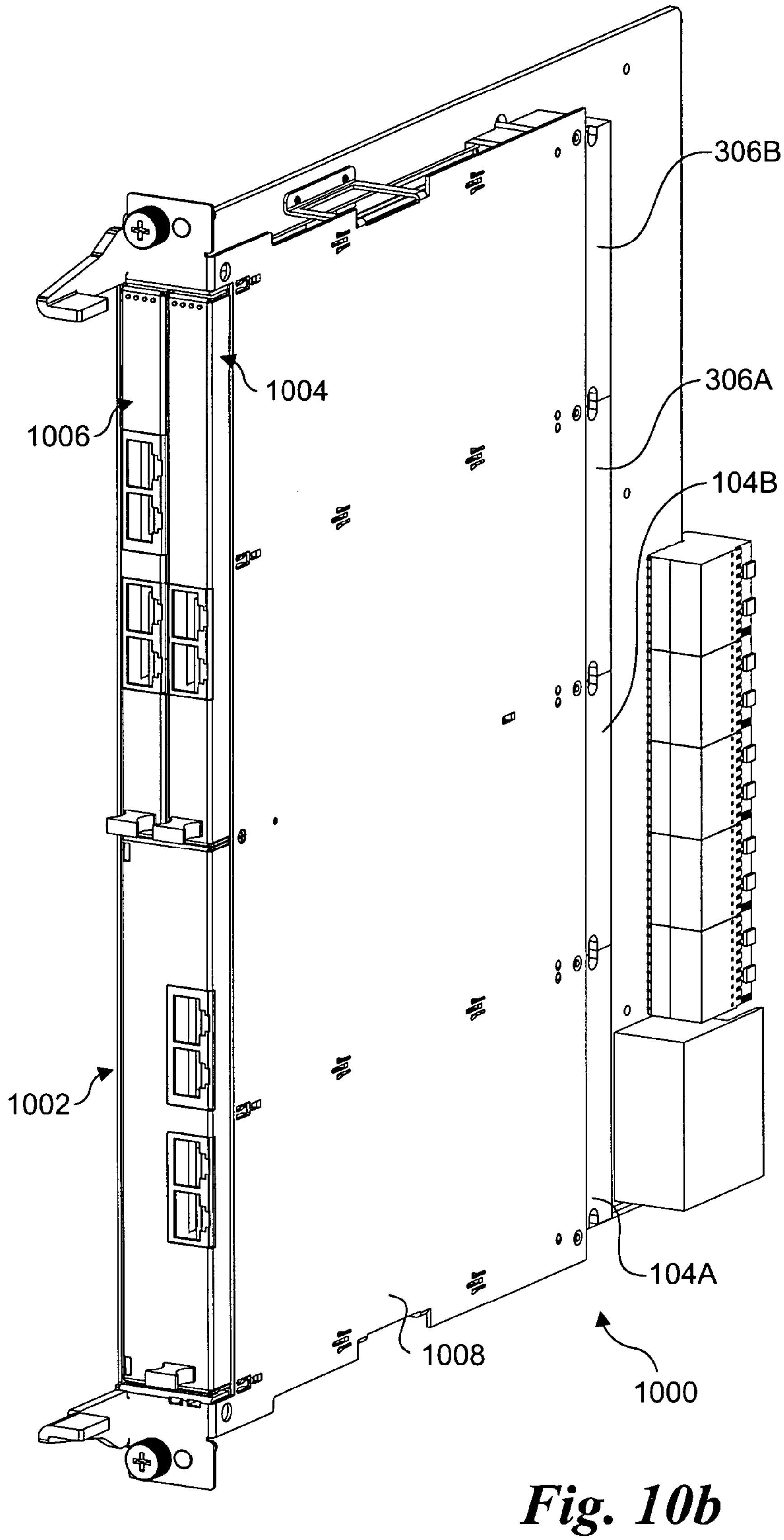
FIG. 10*b* shows an isometric view of the ATCA carrier board assembly of FIG. 10*a*, further including a cover plate used to cover the backside of the AMC module PCBs.

FIGS. 10*a* and 10*b* show an ATCA carrier board assembly 1000 including a full-height adjustable double-width dual connector AMC module 1002, and a pair of half-height adjustable double-width dual connector AMC modules 1004, and 1006. The view shown in FIG. 10*b* further shows a cover plate 1008, which would be installed in a typically implementation: the cover plate is removed in FIG. 10*a* to show details of the connections. The assembly includes an ATCA carrier board PCB 1010 to which a pair of full-height AMC connectors 104A and 104B are coupled and a pair of half-height AMC connectors 306A and 306B are installed. Each of full-height adjustable double-width dual connector AMC module 1002 and half-height adjustable double-width dual connector AMC modules 1004, and 1006 includes a respective double-width dual connector PCB card assembly 800A, 800B, and 800C.

Figure 11:
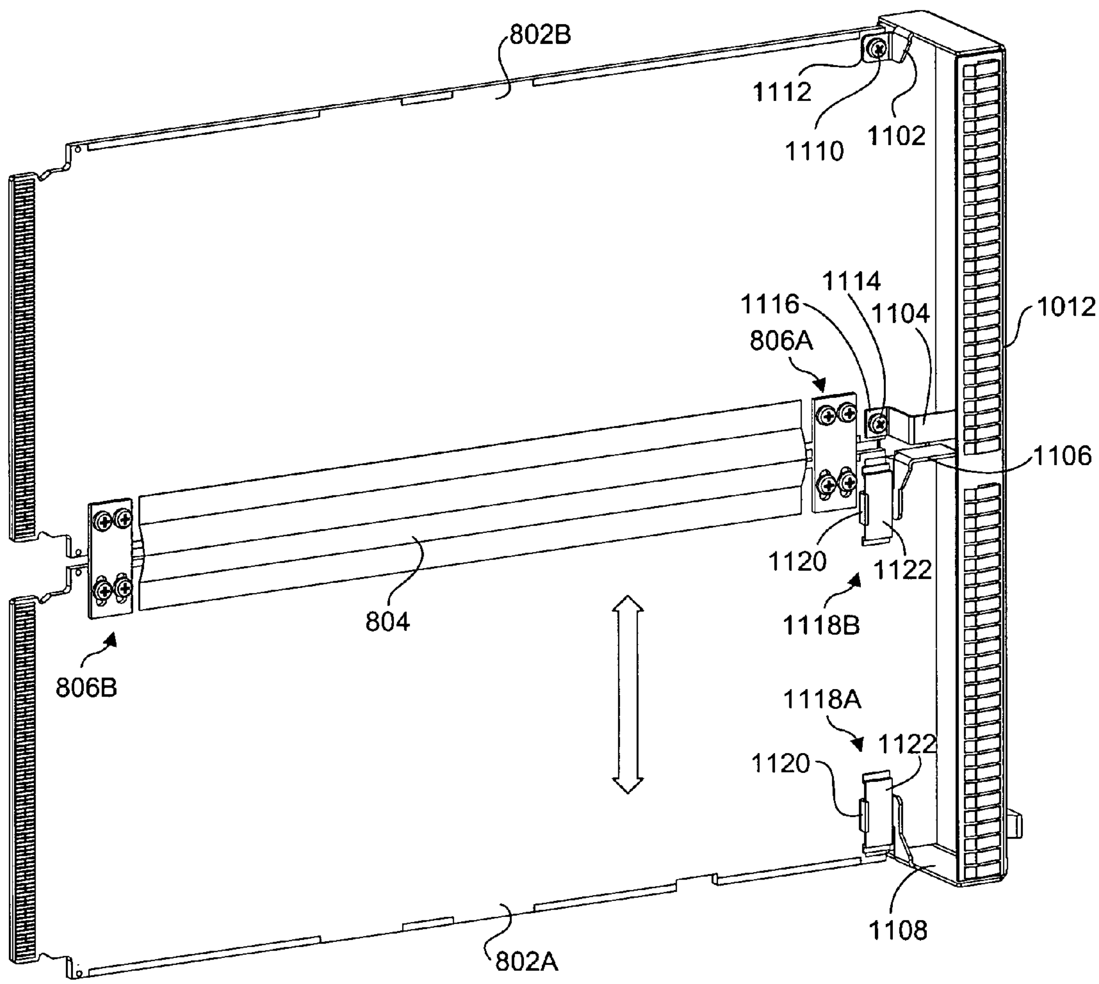
FIG. 11 is an isometric view illustrating the coupling between a pair of PCB cards and a front panel that is enabled to slide relative to one of the PCB cards, according to one embodiment of the invention.

As shown in FIG. 11, a full-height double-width AMC module front panel 1012 is fixedly mounted to one of PCB cards 802A or 802B (shown), but not both. This ensures that the front panel does not prevent the PCB card that it is not fixedly mounted from moving. In further detail, front panel 1012 includes a pair of upper brackets 1102 and 1104, and a pair of lower brackets 1106 and 1108. Upper bracket 1102 is fixedly secured to PCB card 802B via a fastener 1110 passing through a hole formed in a tab 1112. Similarly, upper bracket 1104 is fixedly secured to PCB card 802B via a fastener 1114 passing through a hole formed in a tab 1116.

In contrast to upper brackets 1102 and 1104, lower brackets 1106 and 1108 are not fixedly secured to PCB card 802A. Rather, one or two (as shown) encapsulated tab sliding mechanisms 1118A and 1118B are employed. In the illustrated embodiment, each of lower brackets 1106 and 1108 include a "U"-shaped tab 1120 that is encapsulated by a respective "C"-shaped bracket 1122 having a mating configuration. The C-shaped brackets 1122 may generally be coupled to PCB card 802A using various coupling techniques, such as via fasteners (not shown). In one embodiment, the upper encapsulated tab sliding mechanism 1118B is not employed, as similar functionality is provided by the combination of adjustable-width stiffening assembly 806A and the fixed coupling of front panel 1012 to PCB card 802B via bracket 1104 and fastener 1114.

The encapsulated tab sliding mechanisms of FIG. 11 enables PCB card 802A to freely move in the vertical direction relative to PCB card 802B, while keeping the pair of PCB cards in lateral alignment. In general, similar sliding mechanisms may be implemented to enable movement in the vertical direction (when the PCB cards 802A and 802B are stacked vertically) while keeping the PCB cards in lateral alignment.

Figure 12:
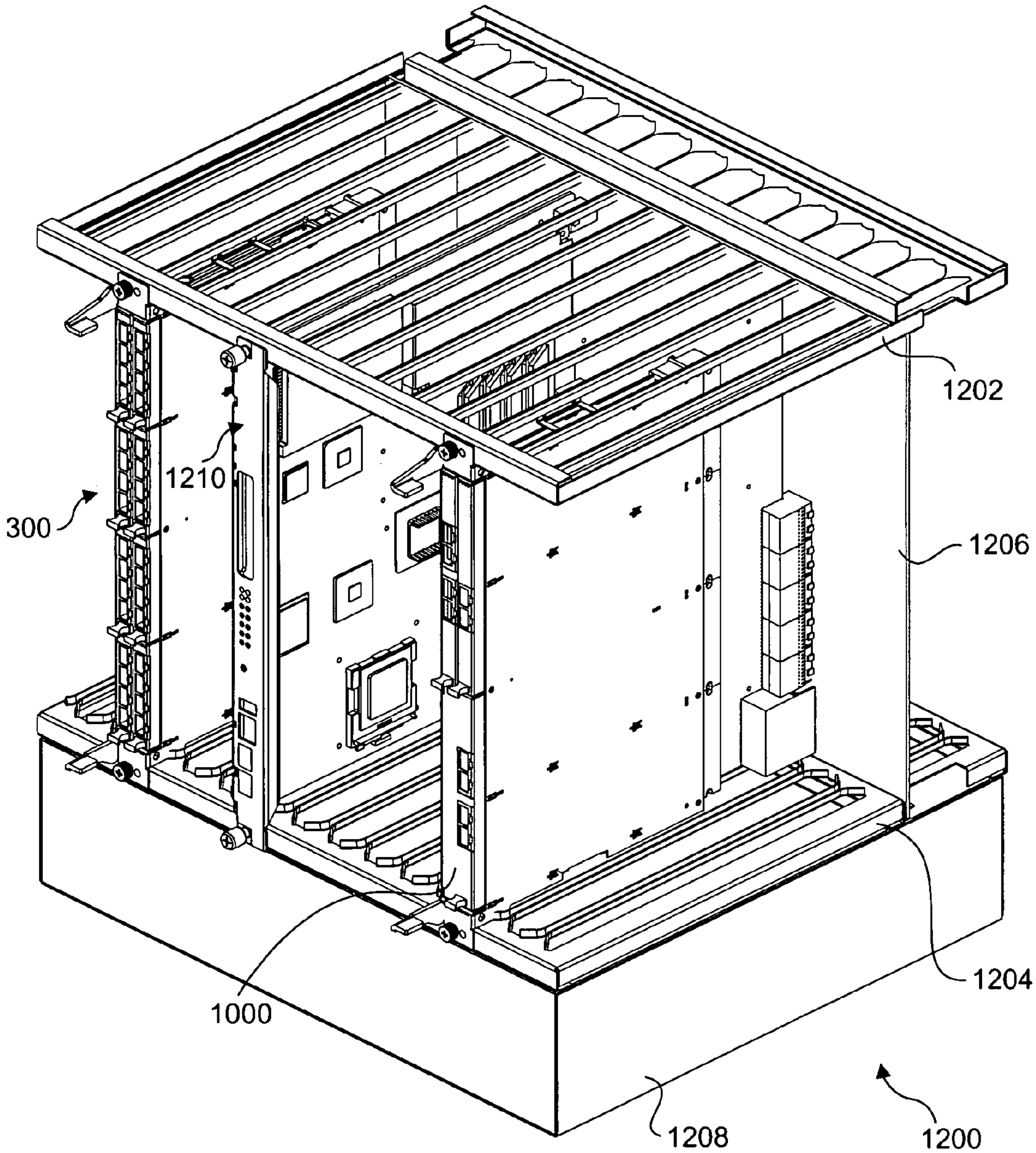
FIG. 12 is an isometric view of an ATCA chassis in which multiple ATCA boards are installed, including the ATCA carrier boards of FIGS. 10*a* and 3.

FIG. 12 shows a partial view of an ATCA chassis 1200 having selected portion removed for clarity. The illustrated components of ATCA chassis 1200 include upper and lower board guides 1202 and 1204, a backplane 1206 and a lower cooling plenum 1208. The illustrated configuration corresponds to a conventional 14-slot ATCA chassis. Missing components include side panels, an upper cooling plenum, cooling fans, one or more rear transition modules and power supply/conditioning circuitry. The exemplary configuration illustrated in FIG. 12 shows three ATCA boards, including an ATCA carrier board assembly 1000 (shown in FIGS. 10*a* and 10*b*), an ATCA board 1210, and an ATCA carrier board 300 (shown in FIG. 3). Each of these ATCA boards is coupled to backplane 1204, enabling components on a given board or card to communicate with components on other boards or cards.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:

a first printed circuit board (PCB) card, having a first connector;

a second PCB card, having a second connector;

a flexible connector, coupled between the first PCB card and the second PCB card; and a width-adjustable stiffening mechanism, coupled between the first and second PCB cards, wherein the flexible connector and width-adjustable stiffening mechanism enable a distance between the first and second connectors to be adjusted while maintaining the first and second connectors in a common plane.

2. The apparatus of claim 1, wherein the flexible connector comprises a flex circuit.

3. The apparatus of claim 1, wherein the first and second connectors comprise edge connectors.

4. The apparatus of claim 1, further comprising:

a first edge rail, disposed on an outside edge of the first PCB card; and a second edge rail, disposed on an outside edge of the second PCB card.

5. The apparatus of claim 1, further comprising:

a faceplate, operatively coupled to at least one of the first and second PCB cards.

6. The apparatus of claim 5, wherein the faceplate is fixedly coupled to a first PCB card and is slidingly coupled to a second PCB card along an axis that is parallel to a connector edge of the second PCB card.

7. The apparatus of claim 5, wherein the apparatus has a form factor corresponding to a half-height double-width Advanced Mezzanine Card (AMC) module and the faceplate comprises a half-height double-width AMC module faceplate.

8. The apparatus of claim 5, wherein the apparatus has a form factor corresponding to a full-height double-width Advanced Mezzanine Card (AMC) module and the faceplate comprises a full-height double-width AMC module faceplate.

9. The apparatus of claim 1, wherein the width-adjustable stiffening mechanism comprises:

a first bracket, having at least one slot defined in a first end and a least one hole defined in an opposing end;

a second bracket, having at least one slot defined in a first end and a least one hole defined in an opposing end; and a plurality of fasteners, to couple each of the first and second brackets to the first and second PCB cards, a respective fastener passing through each of said at least one slot and at least one hole for each of the first and second brackets.

10. The apparatus of claim 9, wherein the fasteners passing through each slot comprises a shoulder screw.

11. An apparatus, comprising:

a carrier board, having first and second mezzanine card connectors, each having first connector slots configured to mate with corresponding first and second printed circuit board (PCB) edge connectors; and a first adjustable double-width mezzanine card assembly, comprising, a first PCB card, having a first edge connector;

a second PCB card, having a second edge connector;

a flexible connector, coupled between the first PCB card and the second PCB card; and a width-adjustable stiffening mechanism, coupled between the first and second PCB cards; and a faceplate, operatively coupled to at least one of the first and second PCB cards;

wherein the flexible connector and width-adjustable stiffening mechanism enable a distance between the first and second edge connectors to be adjusted while maintaining the first and second connectors in a common plane, the first and second edge connectors respectively mated with the first connector slots in the first and second mezzanine card connectors.

12. The apparatus of claim 11, wherein the first adjustable double-width mezzanine card assembly has a form factor corresponding to a full-height double-width Advanced Mezzanine Card (AMC) module.

13. The apparatus of claim 11, wherein the first adjustable double-width mezzanine card assembly has a form factor corresponding to a half-height double-width Advanced Mezzanine Card (AMC) module.

14. The apparatus of claim 11, wherein the carrier board comprises an Advanced Advanced Telecom Computing Architecture (ATCA) carrier board.

15. The apparatus of claim 14, wherein the first adjustable double-width mezzanine card assembly has a form factor corresponding to a first half-height double-width Advanced Mezzanine Card (AMC) module, and each of the first and second mezzanine card connectors have first and second connectors slots configured to mate with corresponding PCB edge connectors, the apparatus further comprising:

a second adjustable double-width mezzanine card assembly having a form factor corresponding to a half-height double-width AMC module, and including, a first PCB card, having a first edge connector;

a second PCB card, having a second edge connector;

a flexible connector, coupled between the first PCB card and the second PCB card;

a width-adjustable stiffening mechanism, coupled between the first and second PCB cards; and a faceplate, operatively coupled to at least one of the first and second PCB cards;

wherein the flexible connector and width-adjustable stiffening mechanism enable a distance between the first and second edge connectors of the second adjustable double-width mezzanine card assembly to be adjusted while maintaining the first and second connectors in a common plane, the first and second edge connectors respectively mated with the second connector slots in the first and second mezzanine card connectors.

16. The apparatus of claim 11, further comprising a stiffener bar disposed across the carrier board and coupled to the first and second mezzanine card connectors.

17. An apparatus, comprising:

a first printed circuit board (PCB) card having a first electrical connection means;

a second (PCB) card having a second electrical connection means;

flexible means for electrically coupling the first PCB card to the second PCB cards; and adjustable stiffening means for coupling the first and second PCB cards, wherein said adjustable stiffening means enables a distance between longitudinal edges along a longitudinal axis perpendicular to the first and second electrical connection means to be adjusted while maintaining the first and second electrical connection means in a common plane.

18. The apparatus of claim 17, wherein the adjustable stiffening means comprises:

first and second brackets, disposed at opposing ends of the first and second PCB cards;

means for fixedly coupling a first end of the first and second brackets to the first PCB card; and means for slidingly coupling a second end of the first and second brackets to the second PCB card.

19. The apparatus of claim 17, further comprising:

a front panel;

means for fixedly coupling the front panel to the first PCB card; and means for slidingly coupling the front panel to the second PCB card along an axis that is substantially parallel with an axis of the first and second electrical connection means.

20. A method, comprising:

electrically coupling a plurality of signal lines between a first printed circuit board (PCB) card and a second PCB card, each of the first and second PCB cards having a respective end connector;

coupling the first and second PCB cards together in a manner that enables a distance between the first and second PCB cards to be adjusted while maintaining the first and second PCB cards in a common plane and keeping the first and second end connectors in alignment; and operatively coupling a front panel to at least one of the first and second PCB cards.

21. The method of claim 20, further comprising:

fixedly coupling the front panel to the first PCB card; and slidingly coupling the front panel to the second PCB card in a manner that enables the distance between the first and second PCB cards to be adjusted.

22. The method of claim 20, further comprising:

concurrently inserting the end connectors of the first and second PCB cards into respective mating connectors disposed in alignment on a carrier board.

23. The method of claim 22, wherein the end connectors for the first and second PCB cards comprise edge connectors, and as each edge connector is inserted into its respective mating connector, the edge connector is centered within a mating connector slot via a self-centering action.

24. The method of claim 22, further comprising:

guiding outside edges for each of the first and second PCB cards as the end connectors of the first and second PCB cards are inserted into the respective mating connectors.

25. A system, comprising:

an Advanced Telecom Computing Architecture (ATCA) chassis, having upper and lower board guides forming a plurality of ATCA board slots and a backplane;

a first ATCA board, coupled to the backplane; and a second ATCA board, coupled to the backplane, comprising, a carrier board having first and second Advance Mezzanine Card (AMC) connectors, each AMC connector having first connector slots configured to mate with corresponding first and second printed circuit board (PCB) edge connectors; and a first adjustable double-width AMC module, comprising, a first PCB card, having a first edge connector;

a second PCB card, having a second edge connector;

a flexible connector, coupled between the first PCB card and the second PCB card;

a width-adjustable stiffening mechanism, coupled between the first and second PCB cards; and a double-width AMC module faceplate, operatively coupled to at least one of the first and second PCB cards;

wherein the flexible connector and width-adjustable stiffening mechanism enable a distance between the first and second edge connectors to be adjusted while maintaining the first and second edge connectors in a common plane, the first and second edge connectors respectively mated with the first connector slots in the first and second AMC connectors.

26. The system of claim 25, further comprising:

a third ATCA board coupled to the backplane comprising a carrier board having a plurality of AMC connectors; and a plurality of AMC modules, each coupled to a respective AMC connector.

27. The system of claim 25, wherein the carrier board further includes third and fourth AMC connectors, each having a respective first connector slot, and the system further comprising:

a second adjustable double-width AMC module, comprising, a first PCB card, having a first edge connector;

a second PCB card, having a second edge connector;

a flexible connector, coupled between the first PCB card and the second PCB card;

a width-adjustable stiffening mechanism, coupled between the first and second PCB cards; and a double-width AMC module faceplate, operatively coupled to at least one of the first and second PCB cards;

wherein the flexible connector and width-adjustable stiffening mechanism enable a distance between the first and second edge connectors to be adjusted while maintaining the first and second edge connectors in a common plane, the first and second edge connectors respectively mated with the first connector slots in the third and fourth AMC connectors.

28. The system of claim 25, wherein each of the first and second AMC connectors include a respective second connector slot, and the first adjustable double-width AMC module comprises a half-height AMC module, the system further comprising:

a second adjustable double-width half-height AMC module, comprising, a first PCB card, having a first edge connector;

a second PCB card, having a second edge connector;

a flexible connector, coupled between the first PCB card and the second PCB card;

a width-adjustable stiffening mechanism, coupled between the first and second PCB cards; and a half-height double-width AMC module faceplate, operatively coupled to at least one of the first and second PCB cards;

wherein the flexible connector and width-adjustable stiffening mechanism enable a distance between the first and second edge connectors to be adjusted while maintaining the first and second edge connectors in a common plane, the first and second edge connectors respectively mated with respective second connector slots in the first and second AMC connectors.

* * * * *